No. 633,283. Patented Sept. 19, 1899.
C. M. DISSOSWAY
MOTOR VEHICLE.
(Application filed Feb. 18, 1899.)
(No Model.) 2 Sheets—Sheet 1.
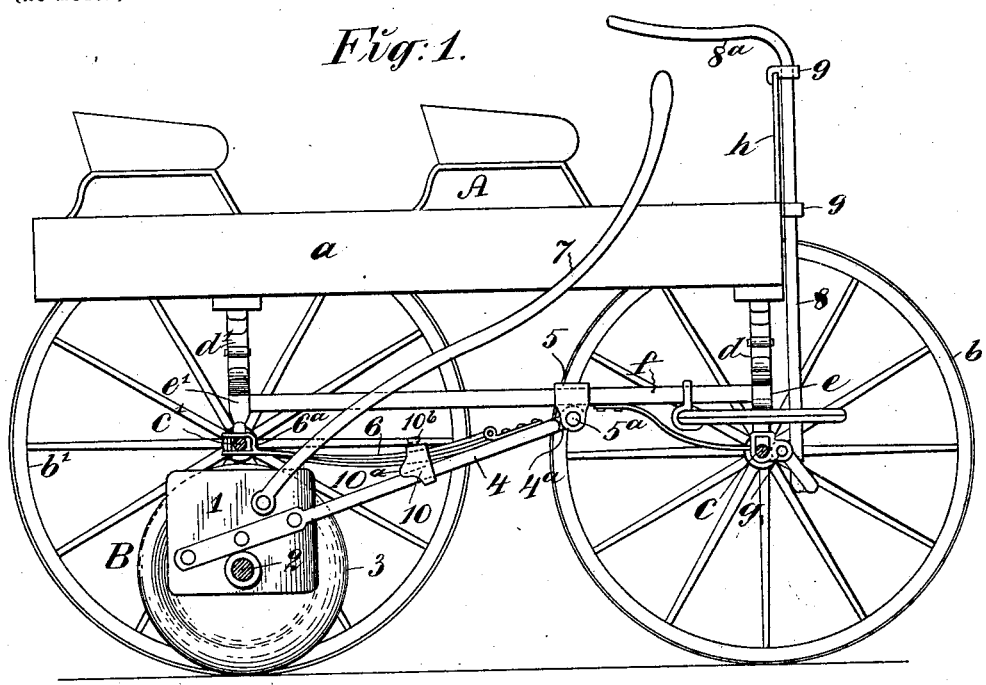
Fig. 1.
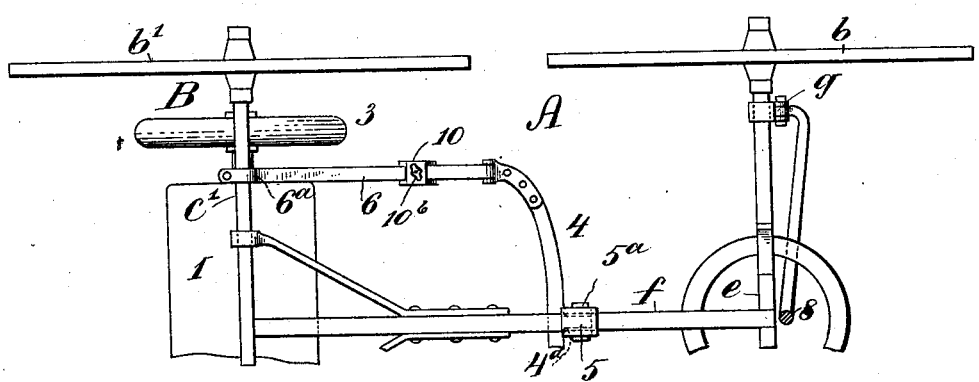
Fig. 2.
Fig. 4.
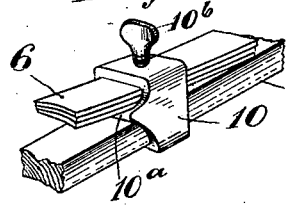
WITNESSES:
INVENTOR
Crowell M. Dissosway
BY
Henry Connett
ATTORNEY No. 633,283. Patented Sept. 19, 1899.
C. M. DISSOSWAY.
MOTOR VEHICLE.
(Application filed Feb. 18, 1899.)
(No Model.) 2 Sheets—Sheet 2.
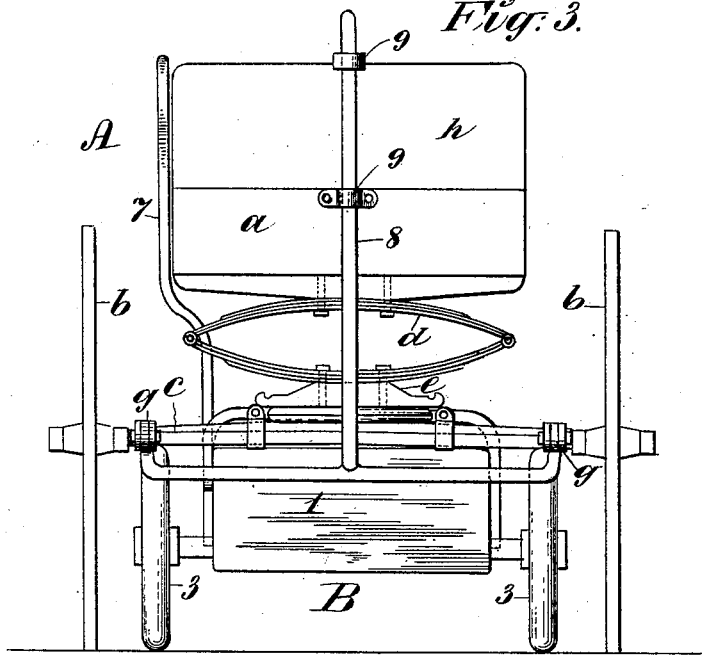
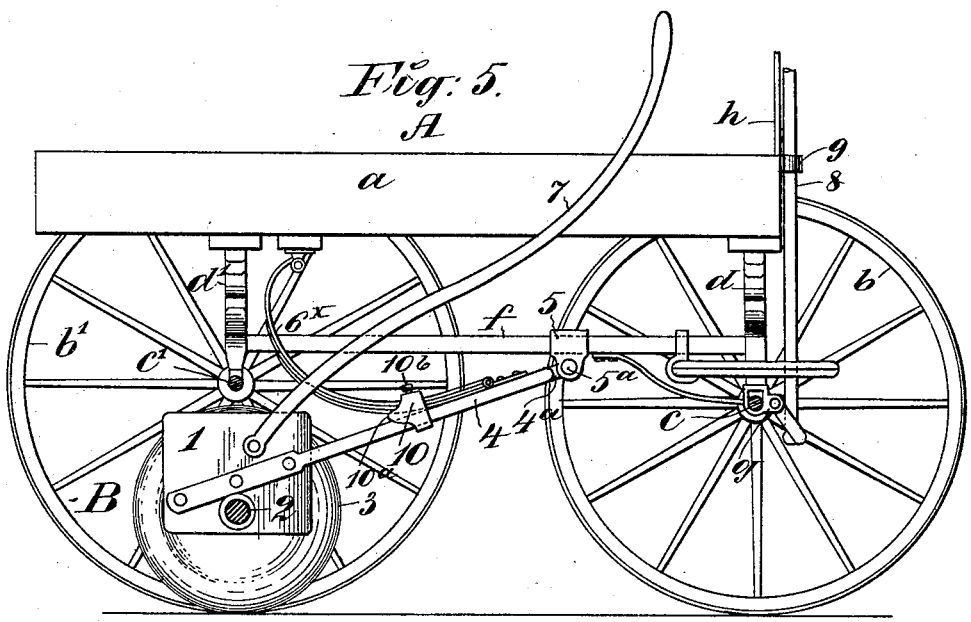
WITNESSES: INVENTOR
Crowell M. Dissosway
BY
ATTORNEY

UNITED STATES PATENT OFFICE.

CROWELL M. DISSOSWAY, OF NEW YORK, N. Y., ASSIGNOR OF ONE-HALF TO JOHN GOODCHILD, GUARDIAN, OF SAME PLACE.

MOTOR-VEHICLE.

SPECIFICATION forming part of Letters Patent No. 633,283, dated September 19, 1899.

Application filed February 18, 1899. Serial No. 706,049. (No model.)

*To all whom it may concern:*

Be it known that I, CROWELL M. DISSOSWAY, a citizen of the United States, residing in the borough of Manhattan, city, county, and State of New York, have invented certain new and useful Improvements in Motor-Vehicles, of which the following is a specification.

This invention relates to the art of propelling vehicles by motors in lieu of drawing them with horses; and it consists in certain improvements in that class of motor-vehicles wherein the latter is adapted to be substituted for a horse in propelling an ordinary motorless carriage or wagon, such as is commonly drawn by a horse.

My invention contemplates the propulsion of an ordinary motorless vehicle, such as a family carriage or a light wagon, adapted primarily to be drawn by a horse or horses, by a motor-vehicle, this latter being without the body, seats, &c., commonly pertaining to a carriage and adapted to be put under the motorless carriage and coupled thereto detachably for driving the latter. Thus any one having one or more ordinary motorless vehicles primarily adapted to be drawn by horses may remove therefrom the poles or thills, place the motor-vehicle under any one of them, clip it fast thereto, and drive it with the motor. The motor-vehicle employed has ground-wheels, and the traction in driving is obtained wholly through these wheels of the motor-vehicle.

In the accompanying drawings, which illustrate embodiments of the invention, Figure 1 is a sectional side elevation showing a two-wheeled motor-vehicle under and coupled to a known form of light motorless vehicle. Fig. 2 is a plan of one-half of the running-gears of the vehicle. Fig. 3 is a front elevation of the vehicle. Fig. 4 is a perspective view, on a larger scale, of the spring-adjusting device. Fig. 5 is a view similar to Fig. 1, illustrating a slightly different construction of the connections between the vehicles.

A represents as a whole the motorless vehicle, and B represents as a whole the motor-vehicle.

Referring primarily to the first four figures of the drawings, $a$ represents the body of any ordinary motorless vehicle; $b$, the front wheels thereof; $c$, the front axle pivoted on a king-bolt in the usual way; $d$, the front spring; $e$, the front bolster; $b'$, the rear wheels; $c'$, the rear axle; $e'$, the rear bolster, and $d'$ the rear spring. $f$ is the reach extending between and connecting the bolsters. All of these parts are common features in road-vehicles of all kinds, and they vary in detail in the different kinds of vehicles. The vehicle A here illustrated is one type.

1 represents a motor of any kind—electric, petroleum, compressed air, or the like. The kind of motor is not material to my invention. This motor drives the axle 2 of the motor-vehicle B, and on it are fixed the ground or traction wheels 3.

As shown in Fig. 1, the motor-vehicle is situated directly under the rear axle $c'$ of the vehicle A to be propelled, and this is the position preferred for the motor.

The motor-casing is coupled detachably to the reach $f$ of the vehicle A to be propelled through the medium of a coupling-bow 4, the ends of which are secured to the motor-casing and the crown of the bow provided with an apertured coupling-lug $4^a$, which enters a clip 5 on the reach and is coupled therein by a cross-bolt $5^a$. Fixed at their forward ends on the lateral branches of the bow 4 are two springs 6 6, which extend back to the rear axle and have forked bearings $6^a$, which embrace the latter.

The motor may be controlled by a lever or arm 7, which is within easy reach of any one sitting in the vehicle, and it may be guided or steered by an upright bar 8, the lower end of which is forked or branched, the branches being secured to the thill-clips $g$ on the front axle $c$. The upright portion of this bar 8 turns in keeper-bearings 9 on the dashboard $h$, and it has an arm or branch $8^a$, which is within easy reach of the person sitting in the vehicle, so that he may turn the front axle about its king-bolt, and thus direct the course of the vehicle.

The motorless vehicle A shown in Fig. 1 has its body $a$ mounted on springs; but it will be obvious that said body might as well be mounted directly on the bolsters, as in the case of some farm-wagons.

In Fig. 5 I have shown a construction wherein the springs pertaining to the motor-vehicle B, and in this figure designated $6^\times$, extend up to and are coupled to the body of the vehicle A. This invention is not restricted to any special way of coupling the motor-vehicle to the motorless vehicle. Being placed under the vehicle A, so as not to extend materially either to the front or rear or laterally beyond the limits of said vehicle A, the motor-vehicle practically occupies no available space or room.

In order that the weight of the load may be transmitted to the motor-vehicle for traction, the rear axle of the vehicle A is supported on the spring-arms or springs 6 or the body on the spring-arms $6^\times$, Fig. 5, and these springs may be made more or less stiff and resistant by means of the wedge-clip 10. (Seen detached in Fig. 4.) This device consists of a clip which embraces both the bow 4 and spring 6 and has a transverse wedging-bar $10^a$, which takes between the two. By moving this device 10 so as to force the bar $10^a$ in between the bow and spring and securing the clip by a set-screw $10^b$ or other means the free end of the spring-arm 6 is elevated, and greater tension is thus put on these springs when the free ends thereof are connected to the vehicle A. The spring-arms 6 may raise the hind wheels of the empty vehicle A off from the ground.

By the placing of the axle 2 of the motor-vehicle B directly under the hind axle of the vehicle A the steering of the vehicle is facilitated, especially where this steering is effected through a steering device such as that shown.

The object of the invention is to adapt a vehicle A to be propelled either by a horse or by the motor B and also to require as little addition to or alteration of the vehicle A as possible. In the construction shown in Fig. 1 only the bearings 9 and clip 5 are added. These may remain fixed on the vehicle A at all times without detriment.

Preferably the springs or spring-arms 6 or $6^\times$, as seen in Fig. 5, will be hinged at the points of attachment to the side members of the bow 4.

Of course the motor-vehicle B may be used to drive any vehicle A. For example, one may have a single motor-vehicle and a number of motorless vehicles to be coupled thereto at will, and it is not essential that these latter be adapted for use with horses.

Having thus described my invention, I claim—

1. The combination with a four-wheeled, motorless vehicle A, of a wheeled motor-vehicle B, situated under the rear part of the vehicle A and provided with a bow 4, which extends forward and is coupled to the reach of the vehicle A, spring-arms, secured at their front ends to the bow 4 and interposed between said bow and the vehicle A, and means for varying the operative length of said spring-arms, substantially as set forth.

2. The combination with a motor-vehicle, adapted to be placed under and secured to a four-wheeled motorless vehicle for driving it, of the said motorless vehicle, having thill-clips on its front axle and a spring between the said axle and the body, of the removable steering mechanism coupled to said clips and extending up above the dashboard, substantially as set forth.

3. A motor-vehicle adapted for driving any ordinary motorless vehicle, and comprising a motor 1, mounted on its wheel-axle 2, the wheels 3 on said axle, a bow 4, fixed at its ends to the motor-casing and adapted to be coupled to the reach of the vehicle to be driven, and springs between said bow and the last-named vehicle, substantially as set forth.

4. A wheeled motor-vehicle adapted for driving any ordinary motorless vehicle, said motor-vehicle comprising a motor, its wheel-axle and wheel or wheels, the bow 4, for coupling to the vehicle to be driven, two spring-arms 6 attached at one end to the respective branches of said bow, and adapted to be coupled at the other end to the vehicle to be driven, and means on said bow for varying the operative length of said arms, substantially as set forth.

5. A wheeled motor-vehicle adapted for coupling to and driving any ordinary motorless vehicle, said motor-vehicle having its motor mounted directly on its wheel-axle, and a U-shaped bow 4, the branches of which are fixed to the casing of the motor and the bow of which is provided with appliances for coupling it to the vehicle to be driven, substantially as set forth.

6. The combination with a motorless vehicle to be driven, a wheeled motor-vehicle under the vehicle to be driven and having a coupling-bow 4, and the springs or spring-arms on the bow and between it and the vehicle to be driven, of the wedge-clips 10, each of which embraces the spring-arms and the bow and has a wedging-bar $10^a$ and a set-screw $10^b$, substantially as set forth.

7. The combination with a motorless, four-wheeled vehicle A, and the detachable, motor-vehicle B, under the rear part of the same, said motor-vehicle having a coupling-bow 4 which extends forward and is coupled to the reach of the vehicle A, of the spring-arms fixed at their front ends to said bow and having forks at their rear ends which embrace the rear axle, substantially as set forth.

In witness whereof I have hereunto signed my name this 16th day of February, 1899, in the presence of two subscribing witnesses.

CROWELL M. DISSOSWAY.

Witnesses:
HENRY CONNETT,
PETER A. ROSS.